US011864303B2

(12) United States Patent
Alavi et al.

(10) Patent No.: US 11,864,303 B2
(45) Date of Patent: Jan. 2, 2024

(54) AIR-COOLED INTERFACE FOR INDUCTIVELY COUPLED PLASMA MASS SPECTROMETER (ICP-MS)

(71) Applicant: Kimia Analytics Inc., Thornhill (CA)

(72) Inventors: Sina Alavi, North York (CA); Gholamreza Javahery, Thornhill (CA); Javad Mostaghimi, Mississauga (CA); Kaveh Kahen, North York (CA)

( * ) Notice: Subject to any disclaimer, the term of this patent is extended or adjusted under 35 U.S.C. 154(b) by 10 days.

(21) Appl. No.: 17/528,846

(22) Filed: Nov. 17, 2021

(65) Prior Publication Data

US 2022/0159819 A1 May 19, 2022

Related U.S. Application Data

(60) Provisional application No. 63/115,394, filed on Nov. 18, 2020.

(51) Int. Cl.
*H05H 1/28* (2006.01)
*H01J 49/10* (2006.01)
*H01J 49/04* (2006.01)

(52) U.S. Cl.
CPC ............ *H05H 1/28* (2013.01); *H01J 49/105* (2013.01); *H01J 49/0468* (2013.01)

(58) Field of Classification Search
CPC ...... H01J 49/105; H01J 49/10; H01J 49/0468; H05H 1/28
See application file for complete search history.

(56) References Cited

U.S. PATENT DOCUMENTS 6,222,186 B1 * 4/2001 Li ......................... H01J 49/105 250/288
2009/0250608 A1 * 10/2009 Mordehai ............ H01J 49/167 250/288
2021/0265153 A1 * 8/2021 Cheung ................ H01J 49/105

FOREIGN PATENT DOCUMENTS

WO WO-2019202719 A1 * 10/2019 .............. H01J 49/04
WO WO-2020092236 A1 * 5/2020 ............. G01N 21/68

* cited by examiner

*Primary Examiner* — David E Smith
(74) *Attorney, Agent, or Firm* — Nasser Ashgriz; UIPatent Inc.

(57) ABSTRACT

An air cooled inductively coupled plasma mass spectrometer (ICP-MS) is disclosed. The interface structure has a configuration that it can rapidly transfer heat away from the front surface of the interface that is exposed to a high temperature plasma, while maintaining heat in the ion beam to avoid recombination and clustering. The air cooled interface of the present system comprises of a set of fins for rapid heat transfer, which may be placed along the sides of the ICP-MS systems in a variety of orientations. Open-cell metal foam is also used to increase heat transfer efficiency. The system may be cooled by natural convention or forced convection using one or more air fans.

34 Claims, 14 Drawing Sheets

AIR-COOLED INTERFACE FOR INDUCTIVELY COUPLED PLASMA MASS SPECTROMETER (ICP-MS)

FIELD OF THE INVENTION

The present invention relates generally to inductively coupled plasma mass spectrometer (ICP-MS) and particularly to a cooling system for an interface used in ICP-MS.

BACKGROUND OF THE INVENTION

Mass spectrometers (MS) are used to determine the constituents of a sample and its chemical composition by measuring the mass-to-charge ratio of ions. Molecular compounds or elements within a sample of interest are detected by first ionizing the molecules and atoms within the sample and then detecting them in a vacuum according to their mass-to-charge (m/z) values using electric and magnetic fields. In order to achieve this, a sample that is to be characterized is ionized and then injected into the mass spectrometer.

One method of sample ionization is by using inductively coupled plasma. A plasma is generated by inducing a radio-frequency current within a flow of gas, (for example, argon, helium, nitrogen, air, etc.). Ionization and atomization occur as a result of the discharge, resulting in an intense heat typically in range of 5,000 to 10,000K.

Another method of sample ionization is by a microwave induced plasma. In this case the plasma is formed by inducing a microwave current into the plasma support gas (for example, argon, helium, nitrogen, air, etc.), resulting is very high temperatures in the range of 5,000 to 10,000K.

The sample can also be ionized by using glow discharge, a flame, an arc, or a spark.

A sample to be analyzed is injected into the plasma, typically using a carrier gas (for example, argon, helium, nitrogen, oxygen, air, etc.). The injected sample is ionized at the extremely high temperatures of the plasma.

The plasma is formed in the ICP torch, usually at atmospheric pressures. Since the mass spectrometer works under vacuum, a sampling interface is usually used to gradually decrease the pressure from atmospheric level to vacuum (i.e., microTorr) in successive stages. The sampling interface operates at reduced pressure, typically a few mbar. The flow of plasma into the interface is thereby driven by the pressure difference between the plasma and the expansion chamber within the interface. To form an ion beam from the sample ions in the plasma, the plasma is sampled through an aperture in the sampling interface operating under vacuum. This is done by implementing a sampler in the interface in the form of a sampler plate or cone that has a narrow aperture, usually about 0.1 to 2 mm in diameter. Downstream of the sampler plate or cone, the plasma expands within the sampling interface as it passes through an evacuated expansion chamber within the interface. A central portion of the expanding plasma passes through a second aperture provided by a skimmer cone into a second evacuation chamber that has a higher degree of vacuum. Downstream of the skimmer cone, there may be additional orifices as well as electrostatic lenses that extract ions from the plasma, thereby forming an ion beam. The resulting ion beam is then deflected and/or guided towards a mass spectrometer by one or more ion deflectors, ion lenses and/or ion guides.

The sampling interface is sensitive to deposits forming on the sampler cone, which deteriorates the performance of the mass spectrometer and results in signal drift, or artefacts in the obtained mass spectrum. Deposits can form on the sampler plate or cone, in particular close to its tip and aperture, resulting in these issues. Clogging can originate in the sampler itself, or it can originate in components of the sampling interface.

Conditions at the sampling interface in ICP-MS are harsh. Due to the extremely high temperature at the plasma source (up to 10,000 K), the sampler, which is in front of the plasma, needs to be cooled. Preventing heat dissipation to the other components of the mass spectrometer is highly necessary in order to protect them from thermal damage. In other words, functionality of the ICP-MS system highly depends on controlling the spread of heat to the temperature-sensitive parts and devices.

Traditionally, the sampling interface is cooled with water (or a water-based coolant or other liquids) to prevent the heat from reaching other parts of the ICP-MS system. Water-cooling is troublesome and adds enormous expenses and complexity. In most cases, bulky chillers are employed to further assist the cooling process by keeping the temperature of the coolant (e.g., water) from rising during operation. A typical chiller requires up to 3 kW power, 5 liters/min water containing a corrosion inhibitor to protect the interface and the aluminum components. Corrosion is, nevertheless, a problem with these chillers. The size and weight of the chiller could be around up to 70×50×65 $cm^3$ and 45 kg, respectively This further adds to the size, footprint, complexity, and cost of the instrumentation. Water-cooling also reduces the temperature of the path where the ions travel through, causing ion recombination and clustering which in turn reduces the sensitivity of the ICP-MS system. Recombination and clustering limit the employment of other desirable devices which can otherwise lead to reducing the limits of detection and improving sensitivity of the instrument.

In order to reduce cost, complexity, and size of ICP-MS systems, elimination of the water cooling and its associated devices is desirable. An air-cooled interface for ICP-MS is highly cost effective, simple, and reduces the size of the system significantly. However, since the thermal conductivity and specific heat capacity of air are significantly lower than those of water, using air as an agent for cooling the ICP-MS interface instead of water or other liquids is extremely difficult. Consequently, designing an air-cooled interface is a challenging task as it needs a deep knowledge of plasma, mass spectrometry, heat transfer, fluid flow, material science, etc. Therefore, several attempts to design an air-cooled interface by others have failed up until now.

Currently, cooling of the interface and its components in conventional ICP-MS systems is typically achieved by mounting the sampler and other components of the sampling interface on a water-cooled plate (i.e., cooling plate, or cooling jacket) on the front end of the interface, facing the ICP source.

SUMMARY OF THE INVENTION

The present invention addresses the above described deficiencies by providing an improved interface for inductively coupled plasma mass spectrometers (ICP-MS). The invention provides an air-cooling system for use at the sampling interfaces, thereby totally removing the need for using water or any other cooling liquids in ICP-MS systems. This invention significantly reduces the size, cost, and complexity of the system, in addition to increasing the cooling efficiency, as compared to the currently available water/liquid cooling systems.

The present system has an air-cooled interface with a sampling orifice mounted on its front surface facing the ICP. The interface may have one or more sampling cones in succession, each working at different vacuum pressures. The air-cooled interface is cooled either naturally (free convection) or by using fans or other devices to circulate air or any other suitable cooling gas. It may also be cooled by a combination of air-cooling and radiation. Depending on the plasma power, the airflow may be adjusted to a range of 20-2000 CFM, preferably between 50-200 CFM. The air-cooled interface may be coupled with one or a combination of an open cell foam heat exchanger, finned heat exchanger, compact heat exchanger, a heat exchanger with a honeycomb structure, or heat pipes to enhance air-cooling of the sampling interface. The open cell foam may be made of metals or alloys of metals such as aluminum, copper, nickel, iron, or non-metals such as carbon, silicon carbide, or ceramics. The porosity of the foam may be up to 98%. The pore density of the foam may be in the range of 1-100 pores per inch (PPI), preferably between 5-20 PPI. The relative mass density of the foam may be in the range of 1-30%. Various thermal resistance are implemented in various locations of the sampling interface to prevent the heat from reaching heat sensitive components of the interface. The material, thickness and length of these thermal resistors are adjusted to control the flux of heat through various components of the interface. The thermal resistors are used in a way to direct and confine the heat close to the path of ions to prevent recombination and clustering.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION

Exemplary embodiments of the present invention are described in the followings with referring to the figures and without limiting the scope of the invention.

The invention here describes a method and design of interface for ICP-MS based on air circulating through a set of fins, a metal foam structure, a compact heat exchanger, or a combination of these methods in order to control heat dissipation to surrounding devices. The presently disclosed air-cooled system enhances the convective heat transfer to the coolant air, using fins, open-cell metal foams, honeycomb structures, compact heat exchangers, or other air cooling systems, or a combination of these methods, as provided here. In some embodiment of the present system, the adjustment of thermal resistance is also used in appropriate locations of the interface to control the spread of heat. This is another novel aspect of the present invention. One or a combination of any of these technologies with the aid of a simple air fan or other air circulation systems provides enough cooling in order to control heat dissipation to surrounding devices while directing the heat toward specific regions of the interface and localizing the necessary high temperatures in the ion beam path to avoid recombination and clustering and improve the sensitivity and lower the detection limits of the ICP-MS instrument.

Figure 1:
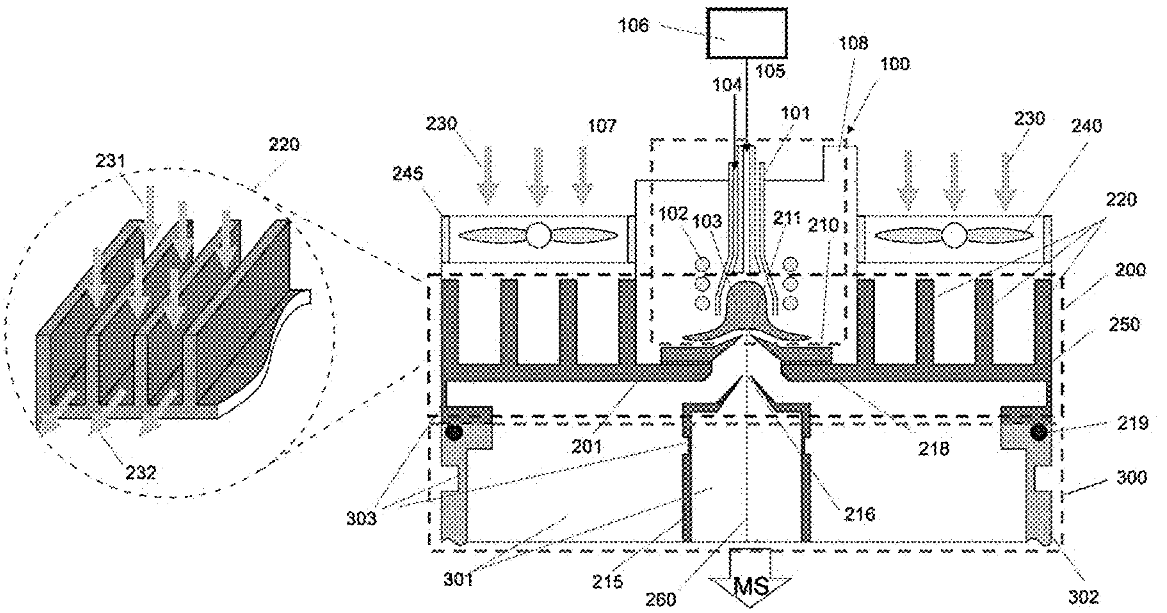
FIG. 1 shows the main elements of the first embodiment of the present ICP-MS system with finned interface.

FIG. 1 shows the main elements of an ICP-MS system comprising of a sample introduction system 106 and an ICP ionization source 100, which is typically at atmospheric pressure and where the sample is ionized, a sampling interface 200, which takes the ions into a mass spectrometer, 300, which is at vacuum 301 conditions in its chamber 302. Ions from the plasma 103 enter the interface 200 through a sampler 210 and/or skimmer 215, having a small aperture 211 and/or orifice 216, respectively, with an internal diameter that is typically in the range of 0.1-5 mm. Different systems may have different types of samplers. FIG. 1 shows an ICP-MS system, which comprises of an inductively coupled plasma (ICP) torch 101 a portion of which is located inside a load coil 102, generating plasma 103. The plasma support gas 104 (e.g., argon), which flows through the torch 101, under the intense electromagnetic field generated by the coil 102 turns into plasma at temperatures in the range of 5000-10,000K. Typical plasma powers can be in the range of 300-3000 W, with gas flow rates ranging between 1-50 L/min. The plasma torch 101 can be comprised of 1, 2, 3 or more tubes, with various geometrical features, made from different materials such as fused silica, quartz, ceramic, boron nitride, alumina, or other materials, depending on the design and application. The sample introduction system 106 carries the samples with a carrier gas 105 which are then injected into the plasma for ionization. The carrier gas may be one or a combination of different gases such as argon, air, nitrogen, hydrogen, oxygen, helium, water vapor, etc.

In particular, a large number of sealing systems, such as sealing gaskets 218, and O-rings 219 are used to keep the sampling interface and MS at vacuum conditions. High temperatures will damage these seals. Therefore, either special and very costly seals have to be used or the seals have to be located far from the high temperature zone, adding complexity, cost and footprint to the device. In the present system, a set of thermal resistors 303 are used to prevent heat from reaching the components of the device that are prone to damage by heat. Thermal resistors 303 may also be used to prevent the spread of heat toward other sections of the MS which contains heat sensitive electronics, turbopumps, heat sensitive components, detectors, ion guides, mass analyzers, flow control and sensing components, etc. The thermal resistors are any of a set of thin walls, long walls, insulators, materials with medium to low thermal conductivity, or a combination thereof.

The front surface 201 of the interface 200 that faces ICP torch 101 is in close proximity to the ICP source (1-20 mm from the outer coil), and therefore, it is exposed to high plasma temperatures, and needs to be cooled. Prior ICP-MS systems use water/liquid cooling systems to cool the front side of the interface that is exposed to plasma as well as the other components that may be mounted on the various stages and locations of the interface such as sampler cones, skimmer cones, apertures, ion guides and lenses, sensors, ion deflectors, electronic components, etc. This is because liquids (especially water) typically have much higher thermal conductivity, density, and specific heat capacity compared to gases, making them the first, obvious choice for cooling purposes. Water cooling used in conventional ICP-MS systems increases complexity, expense, and system size. It also causes temperature drop in the path of the ion beam 260, increasing probability of recombination and cluster forming. To avoid recombination and cluster forming, MS designers are normally forced to reduce the length of ion trajectory path and hence limiting the other and more effective ion transfer devices and methods that can otherwise be used along the path of the ion beam. The present invention discloses an air cooled interface with targeted cooling to only cool the interface surfaces, and not the ions.

FIG. 1 shows one embodiment of the present system with an air cooled heat exchanger. Air cooling system of FIG. 1 has fins 220 to enhance the heat transfer efficiency. One or more air fans 240 are used to force the air 230 through the fins, generating forced convention. In general, other cooling gases, instead of air, can be used as the cooling fluid.

Figure 2:
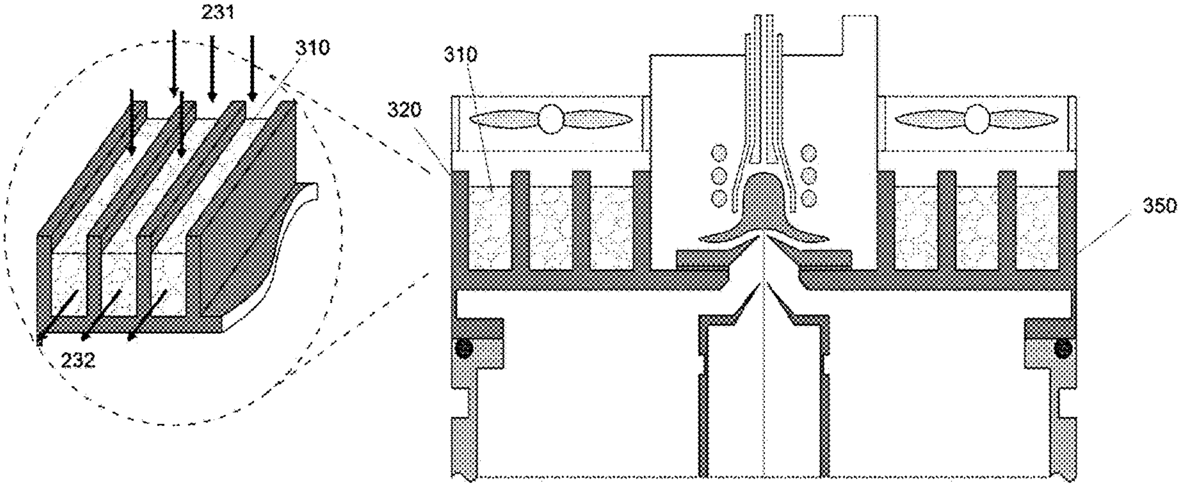
FIG. 2 shows a second embodiment of the present system with fin and open-cell metal foam interface.

FIG. 2 shows another embodiment of the present system in which open-cell metal foam 310 is used to enhance the heat transfer efficiency between the air and the fins 320 and the interface body 350. Open cell metal foams 310 can be made out of aluminum, molybdenum, titanium, copper, nickel, stainless steel, and a number of other metals. These foams have typically up to 97% porosity and between 5 to 80 pores per inch (PPI) which translates into 400 to 5,300 $m^2/m^3$ specific surface area.

Open-cell foams are a new type of highly porous and permeable structures, with random cavities and a high ratio of surface area to volume, made from different materials (e.g., Al, Cu, Ni, carbon, ceramics, etc.). The cooling agent (e.g., air) can easily circulate through the cavities, providing a very large surface area for convective heat transfer. Heat transfer from the foam fins/struts to the cooling agent provides substantial enhancement in cooling capabilities of metal foams which results in a high rate of convective heat transfer from the cooling target to the cooling agent. Also the random positioning of the pores/cavities induces circulation and mixing of the fluid, which again improves heat transfer from the struts to the fluid. FIG. 2 shows pieces of aluminum foam 310 sandwiched between fins 320. The foam may be attached to the fins using high-temperature thermal epoxy. As another method, these foams can be attached to the substrate by placing a brazing sheet/foil of suitable composition between the foam and substrate and brazing them inside a furnace at a suitable temperature. Using a vacuum furnace is preferred to prevent the formation of any oxides on surfaces which will deteriorate the quality of the braze. Cooling air enters 231 the foam from one face and exit 232 the foam from another face.

Figure 3:
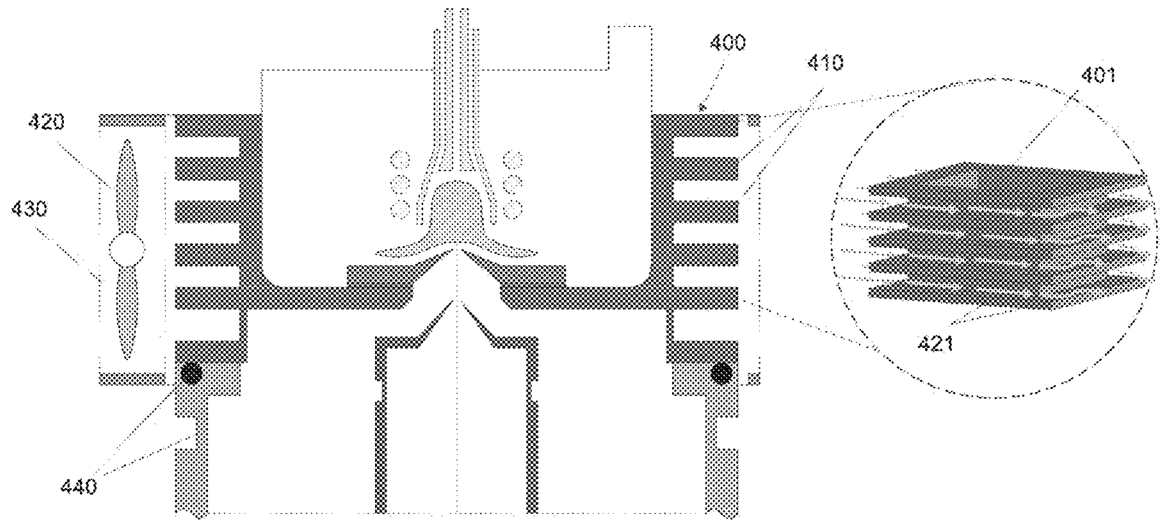
FIG. 3 shows a third embodiment of the present system with a finned interface configured to enclose the ICP and having fins on its outer periphery.

FIG. 3 shows another embodiment of the present system. The interface 400 comprises of a rectangular 401 heat exchanges with fins 410 on its outer surface. The heat exchanger is enclosed with an outer shell 430. A fan 420 forces cool air 421 through the fins from one side, and warm air exits from the other side. The outer shell 430 ensures that the cool air circulates around the interface to absorb as much heat as possible through the fins. The ICP torch is placed inside the rectangular finned interface. It is understood that the interface can have any shape, such as circular or elliptical to better match the design of the sample introduction system. Positioning of the fins on the periphery of the interface body may be preferred depending on how the interface is coupled with the MS, in order to make a more compact interface design. It is desired to prevent the cooling air from disturbing the plasma which may cool it down or extinguish it. In some design variations, the interface may be fluidically coupled with the MS through long thin walls 440 which can act as a thermal resistor. This will ensure that the conductance of the heat from the plasma to the MS through the interface body is minimized. Therefore, conventional sealing components such as rubber O-rings may be used to seal the vacuum chamber of the MS without the fear of damage or degradation due to excess heat. In some design variations, additional thermal resistors 440 may be implemented on the MS vacuum chamber itself, to limit the conductance of heat through the vacuum chamber to other heat sensitive parts of the MS.

Figure 4:
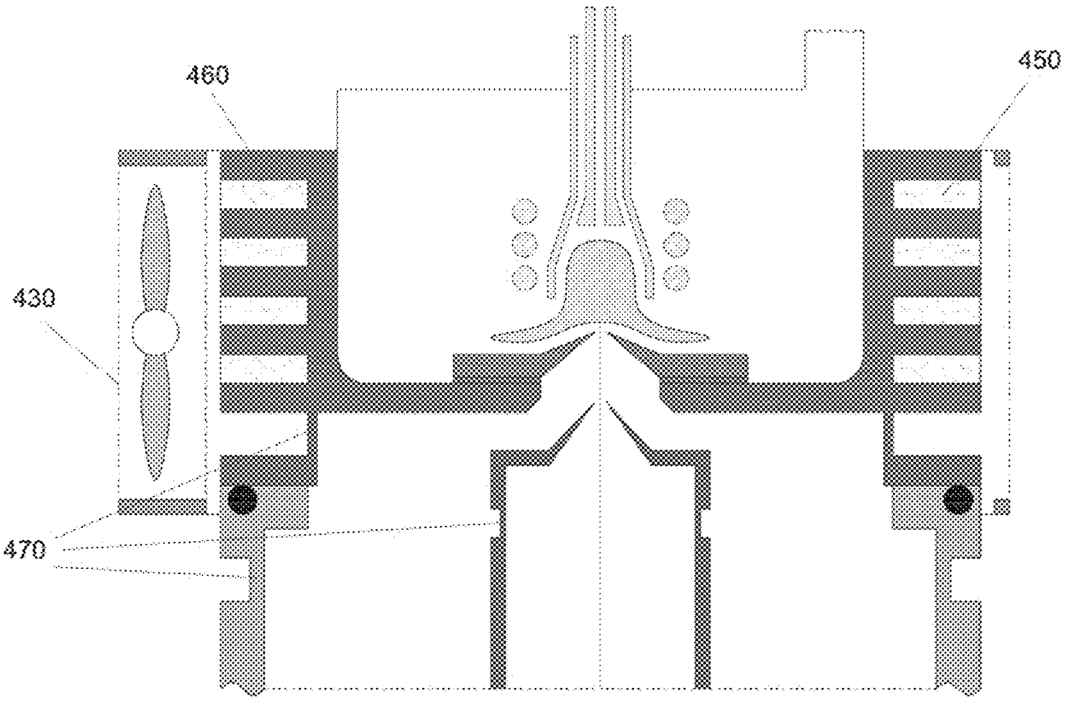
FIG. 4 shows a fourth embodiment of the present system with a finned interface configured to enclose the ICP and having fins on its outer periphery and open-cell metal foam in between the fins.

FIG. 4 shows another embodiment similar to FIG. 3 but it further comprises of metal foam 450 in between the fins 460 to enhance the heat transfer 450. Foams may be attached by brazing, using thermal paste, thermal epoxy, thermal grease or any other suitable methods. It should be ensured that thermal contact resistance between the foam and the surface is minimized to be able to dissipate the maximum amount of heat to the foam and the cooling agent. Fans 430 can then be used to force the air through the pores of the foam and cool the interface. Thermal resistors 470 are strategically placed to prevent heat transfer to parts that can be damaged by heat. For example, thermal resistors 470 may be implemented in various locations of the skimmer in the form of long, thin walls, use of materials with suitable thermal conductivity, or adjusting the dimensions of the skimmer to limit and control the spread of heat to the skimmer base where sealing components may exist to fluidically couple the skimmer to the interface or the MS body.

Figure 5:
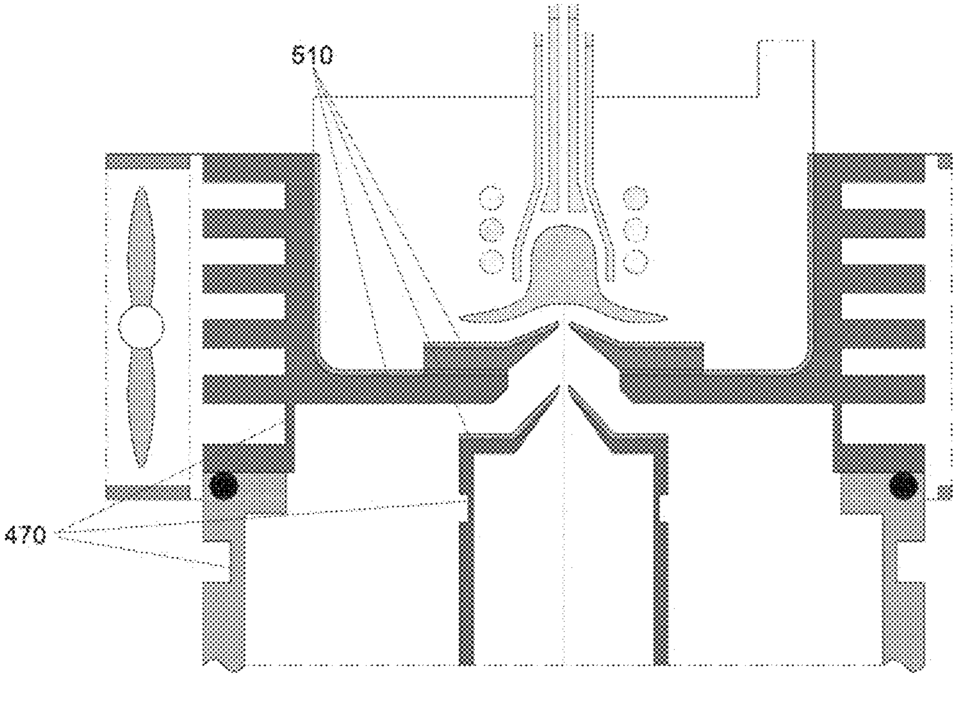
FIG. 5 shows a fifth embodiment of the present system with a finned interface configured to enclose the ICP and the interface and having fins on its outer periphery and a thermal barrier coating applied on various surfaces of the sampling interface.

FIG. 5 shows another embodiment of the present system that uses thermal barrier coatings on surfaces that may be exposed to high temperatures. Based on Fourier's law of heat conduction, thermal resistance ($R_{th}$) can be increased by choosing a material with a higher thermal resistivity ($\rho_{th}$), increasing the distance over which the heat travels (L), or decreasing the cross-sectional area (A) through which the heat flows (Equation 1). For example, reducing the thickness of the material (in order of 0.1 to 0.5 mm), or increasing the length of the material (by several millimeters or several centimeters as required), or using materials with higher thermal resistivity at suitable points of system can provide a restriction to the heat transfer. Herein we are adjusting the thermal resistance at suitable points of the interface of ICP-MS to restrict the heat from reaching certain heat-sensitive components of the system, and direct the heat toward regions of the interface where it can be exploited to improve the performance of the system by minimizing recombination and clustering, or dissipated to the surrounding as desired.

$$R_{th} = \frac{L \times \rho_{th}}{A} \qquad \text{(Eq. 1)}$$

FIG. 5 shows the use of thermal resistance in combination with air cooled fins to increase heat transfer efficiency, respectively. Thermal barrier coatings as thermal resistors are applied on the front face of the interface 510. In this case, a thin layer of thermal barrier coating is applied on various surfaces of the interface, such as interface cones, torch housing, cone mounts, etc., which are exposed to the plasma. Some examples for the materials used for these coatings are one or a combination of yttria-stabilized zirconia (YSZ), alumina, yttria, ceria, zirconia, rare-earth oxides, rare-earth zirconates, etc. These coatings typically have a high thermal resistance as well as high melting point which makes them suitable for high-temperature applications. Therefore, the coating prevents the penetration of heat into various components of the interface. Additionally, the cooling load on the heat exchanger and the cooling agent will be reduced. On the other hand, the material of the coating may be chosen in a way to be resistant against a variety of corrosive materials typically present inside the plasma. Therefore, they can increase the lifetime of interface components, e.g., sampling cones. Choosing and adjusting the composition, thickness, application method and other parameters of these coatings are important in order to ensure a proper bond between the coating and the surface and prevent any peeling-off of the coating due to the mismatch of the coefficients of thermal expansion of the coating and the surface. Some variation of thermal barrier coatings (e.g., YSZ, alumina, yttria, etc.) may take a porous structure when deposited on the surface using techniques such as thermal spraying. In such a case, when heated, these coatings start to radiate heat from their surface and body as near black body emitters which can significantly improve the heat dissipation capability of the interface in combination with air cooling. This is another important aspect of the present invention.

Figure 6:
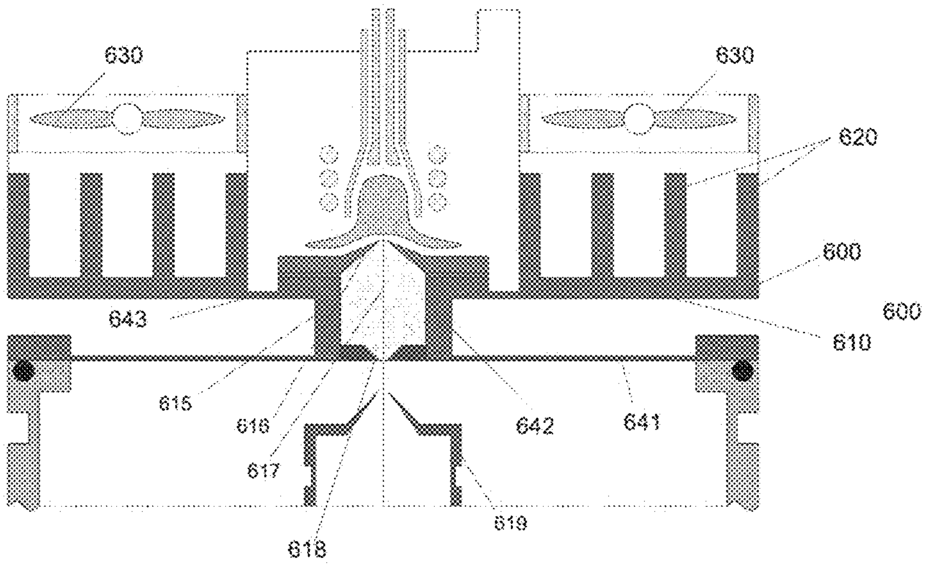
FIG. 6 shows a sixth embodiment of the present system with cooling system located both on the sides and beneath the front surface of the interface.

FIG. 6 shows another embodiment of the present system in which the surface 610 of the interface 600 is extended, and the fins 620 are positioned on the extended surface 610 of the interface. Cooling fans 630 are used to generate forced convention for rapid cooling of the interface. In addition, a channel 615 is placed beneath the sampler cone 616 to have a better control on the heat content of ions. The ion beam 617 enters the channel 615 and exits from a second orifice 618. A skimmer 619 collects the ions to transfer to the mass spectrometer. The channel wall connecting the sampler cone to the second end of the channel 642 is designed in a way to transfer the heat absorbed by the sampler cone to the second end of the channel and heat the second orifice 618. Extra thermal resistors 641 are implemented to limit further spread of this heat to the surrounding and contain it around the path of ion beam to prevent recombination and cluster formation. Another set of thermal resistors 643 can be implemented around the sampler cone to control the dissipation of heat from the sampler cone to the fins and direct a desired amount of the heat absorbed by the sampler cone toward the channel. In this design, the heat is contained along the path of ion beam and in the channel to prevent recombination and cluster formation. The geometry of the second orifice 618, the thickness and length of channel wall 642, and the thermal resistors 641 may be adjusted in order to fine-tune or maximize the amount of heat contained around the path of ions. The diameter of the second orifice may also be adjusted to control the pressure, temperature, and velocity inside the channel 615 to further minimize recombination of ions and ion cluster formation.

Figure 7:
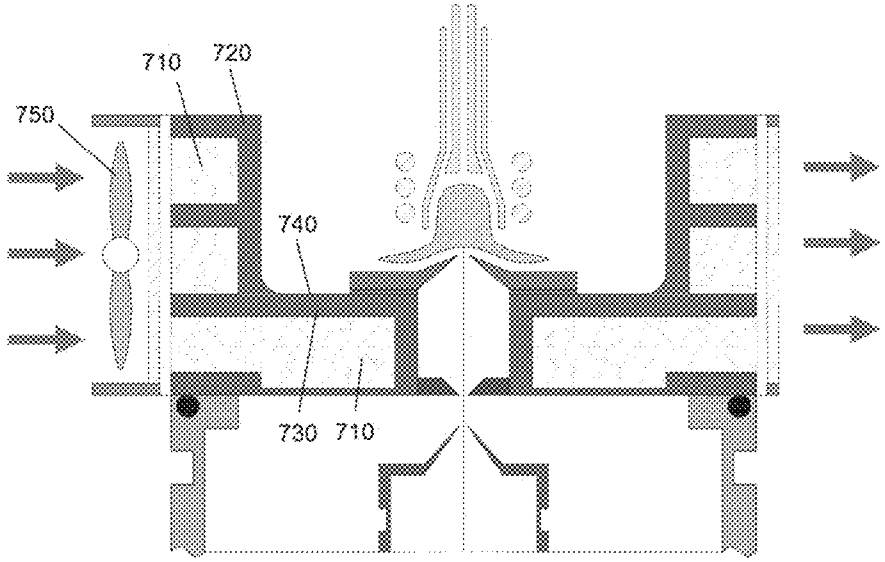
FIG. 7 shows a seventh embodiment of the present system with an open-cell metal foam on the sides and beneath the front surface of the interface.

FIG. 7 shows another embodiment of the present system, in which foam structure 710 is places both on the sides 720 of the interface and on the bottom side 730 of the front surface 740 of the interface. A fan 750 forces air through the fins and foam for efficient cooling.

Figure 8:
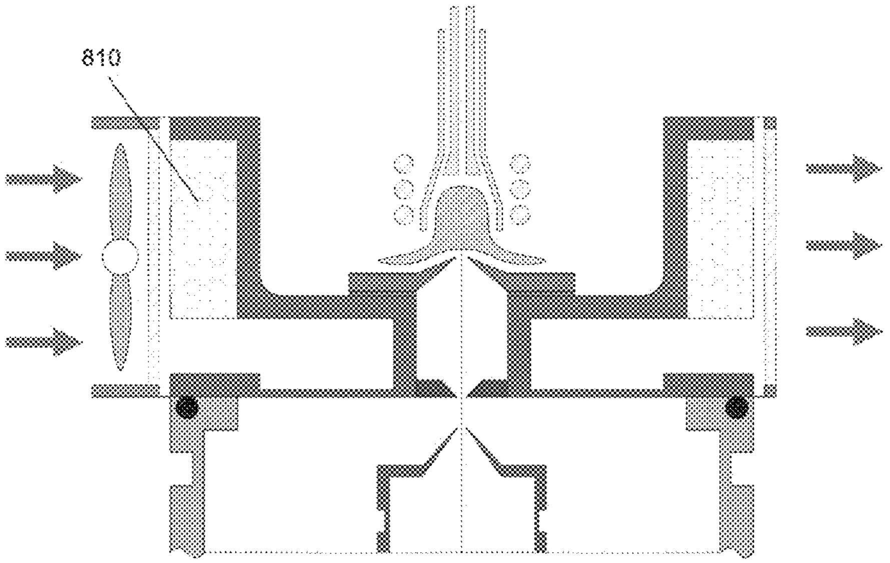
FIG. 8 shows an eight embodiment of the present system with a honeycomb structure as a heat exchange material.

FIG. 8 shows another embodiment of the present invention, in which a honeycomb structure 810, instead of metal foam, is used to enhance the heat transfer.

Figure 9:
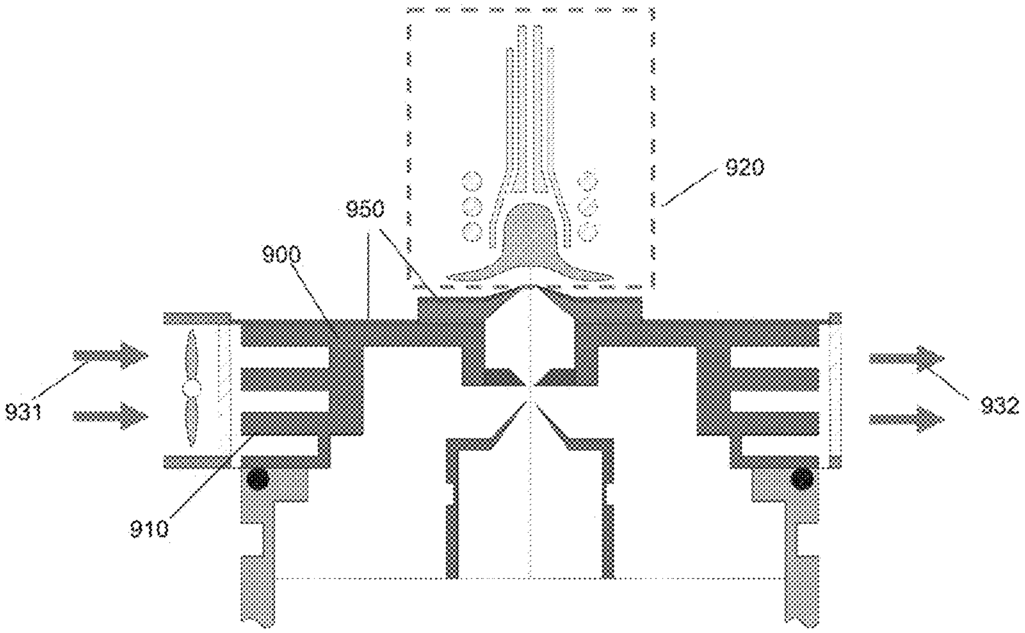
FIG. 9 shows a ninth embodiment of the present system with a finned interface configured to enclose only the interface and having fins on its outer periphery.

FIG. 9 shows another embodiment of the present invention, in which the interface 900 is cooled by fins 910 located below the ionization zone 920. Air comes in 931 and out 932 around the interface for efficient cooling. The front surfaces of the interface and the cone are coated 950 by thermal barrier coatings. This design opens some space around the ICP torch and the front surface of the interface. At the same time, spread of heat to the MS chamber is limited using thermal resistors at the position where the interface is sealed against the MS chamber.

Figure 10:
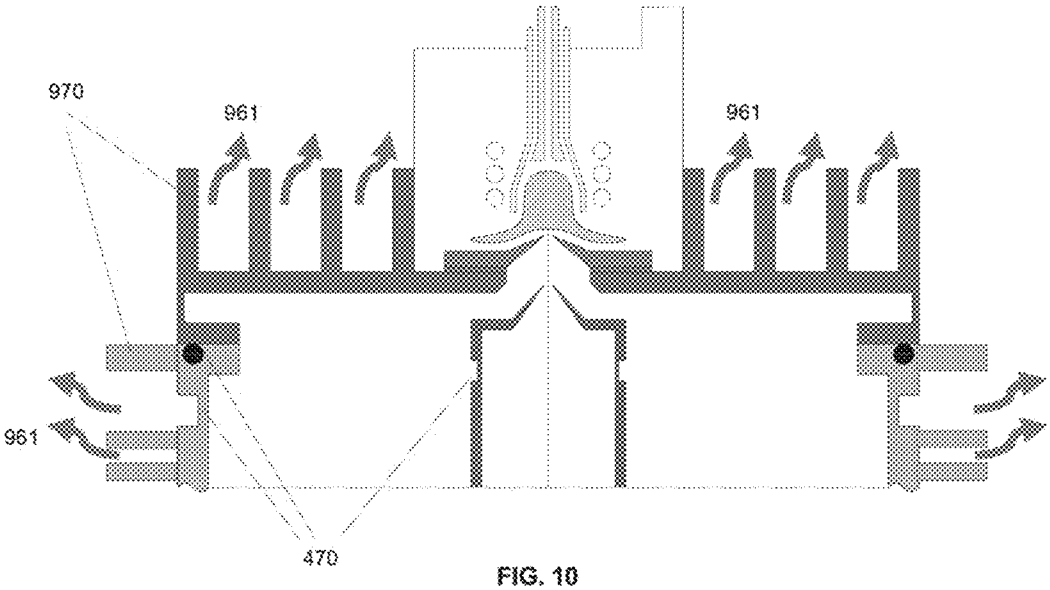
FIG. 10 shows a tenth embodiment of the present system with a natural convection heat exchanger system with finned interface structure.
Figure 11:
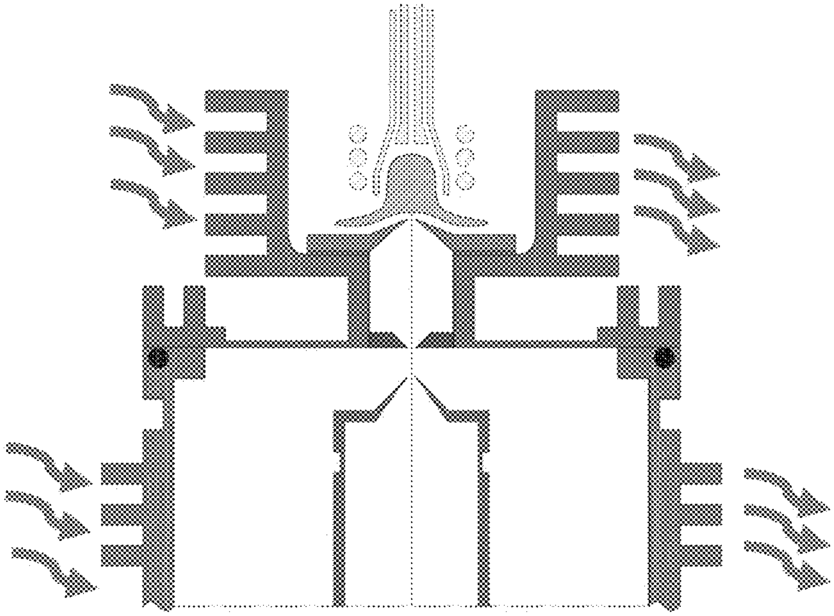
FIG. 11 shows an eleventh embodiment of the present system with a natural convection heat exchanger system with finned interface structure.

Depending on the size of the system, a free (natural) convention may be sufficient to cool the system, without any need for a fan to force the air through the system. FIG. 10 shows one such system, in which the natural convention 961 is sufficient to cool the system. The number and size of fins 970 are designed to air cool the system without a forced convention. FIG. 11 is another embodiment of the present system in which the natural convention system is used to cool the ICP and interface.

Figure 12:
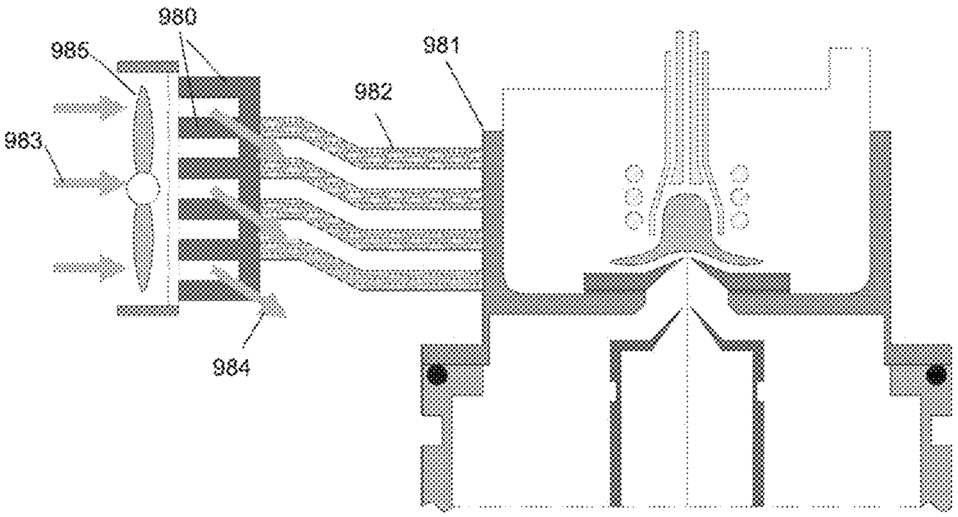
FIG. 12 shows a twelfth embodiment of the present system with a set of heat pipes connecting the finned heat exchanger to the interface.

FIG. 12 shows another embodiment of the present system, in which the air cooling heat exchanger 980 is moved away from the interface 981 and it transfers heat through a set of heat pipes 982. Air enters 983 and exits 984 the heat exchanged 980, by a fan 985. This design results in a more compact interface and torch housing around the plasma torch by transferring the heat through heat pipes to somewhere else in the system where it can be conveniently dissipated by the air-cooled heat exchanger.

Figure 13A:
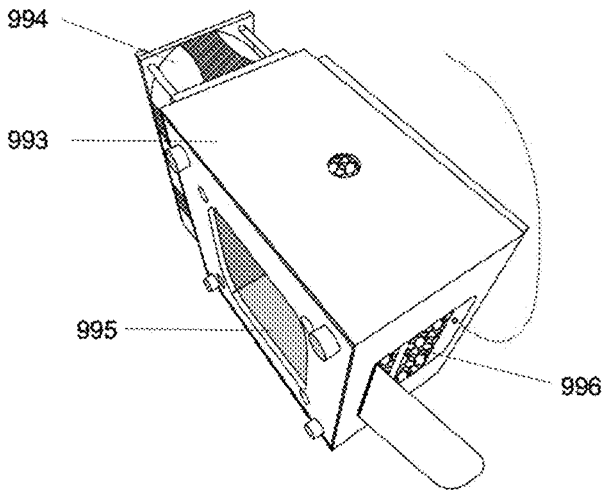
FIG. 13A shows the air-cooled sampling interface for ICP-MS with a fan to circulate air through a set of open-cell metal foams.
Figure 13B:
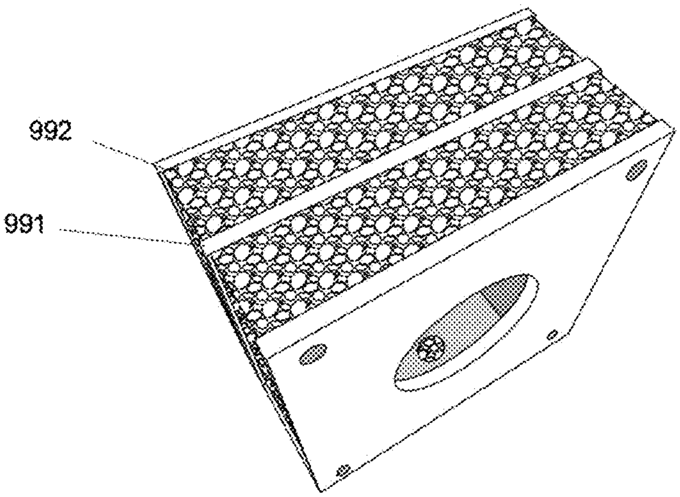
FIG. 13B shows the air cooled heat exchanger with aluminum foam sandwiched between fins.

FIGS. 13A and 13B show a finned 991 cooling system with aluminum foam 992 sandwiched between them and attached to them using high-temperature thermal epoxy. The system is in an enclosure 993, with a fan 994 attached to its outer surface. The ionization source is located inside the opening 995 of the system. Cooling air leaves the opening 996 of the system.

In operation, an inductively coupled plasma is generated by winding a load coil around the torch and supplying an alternating current through a radio-frequency generator; injecting one or various plasma gases to the ICP torch, and generating an electrical spark to ignite the plasma. The frequency of the plasma may be in the range of 400 kHz to 100 MHz, preferably between 27 to 40 MHz. The plasma power can be between 300 W to 2000 W, more typically between 700 W-1600 W, preferably between 700 W-1000 W. One or more types and flows of gases may be introduced to the plasma torch for the purpose of generating the plasma, carrying the sample, or cooling the torch walls. The plasma gas may be one or a combination of various gases such as argon, helium, air, nitrogen, oxygen, hydrogen or any other suitable atomic or molecular gases. The plasma gas flow rate may be in the range of 0.5-20 L/min, preferably 1-10 L/min, also 5-8 L/min.

Once the plasma is generated, it is set in front of a sampling orifice. The orifice diameter may be in the range of 0.1-5 mm, preferably 0.3-1 mm, more precisely 0.3-0.7 mm. The distance between the sampling orifice and the end of the load coil around the ICP torch may be adjusted to optimize signal intensity, sensitivity, plasma signal stability, matrix effects, etc. The distance may be in the range of 1-20 mm, preferable 5-10 mm.

The sampling orifice may be made of a high-temperature material, for example, nickel, copper, aluminum, platinum, molybdenum, stainless-steel, alloys of various metals or ceramics. The sampling orifice may be coated with on or multiple layers of a thermal barrier coating to protect the orifice from thermal damage and corrosion. The thickness of the coating may be in the range of 50 nm to 2 mm, preferably between 1 μm to 0.5 mm. The coating material may be one or a combination of yttria-stabilized zirconia (YSZ), alumina, yttria, ceria, zirconia, rare-earth oxides, rare-earth zirconates.

The sampling orifice is mounted on an air-cooled sampling interface. The interface typically houses one or more sampling cones in succession, each working at different vacuum pressures. The range of vacuum may be between 10-10 Torr to 500 Torr, preferably between 10-7 Torr to 10 Torr. The air-cooled interface may be cooled using fans or other devices to circulate air or any other suitable cooling gas. Depending on the plasma power, the airflow may be adjusted to a range of 20-2000 CFM, preferably between 50-200 CFM.

The air-cooled interface may be coupled with one or a combination of an open cell foam heat exchanger, finned heat exchanger, compact heat exchanger, a heat exchanger with a honey-comb structure, or heat pipes to enhance air-cooling of the sampling interface. The open cell foam may be made of metals or alloys of metals such as aluminum, copper, nickel, iron, or non-metals such as carbon, silicon carbide, or ceramics. The porosity of the foam may be up to 98%. The pore density of the foam may be in the range of 1-100 pores per inch (PPI), preferably between 5-20 PPI. The relative mass density of the foam may be in the range of 1-30%.

Various thermal resistance may be implemented in various locations of the sampling interface to prevent the heat from reaching heat sensitive components of the interface. The type, material, thickness and length of these thermal resistors may be adjusted to control the flux of heat through various components of the interface. The thermal resistors may be adjusted in a way to direct and confine the heat close to the path of ions to prevent recombination and clustering.

The sampling interface may include sealing components at various locations to keep the vacuum inside the mass spectrometer and the sampling interface. These sealing components may be one or a combination of O-rings, gaskets, or washers made from various suitable materials such as rubber, plastic, metal, ceramic, alloys, composite materials, or graphite. The thermal resistors mentioned above, may be adjusted in a way to prevent the heat from reaching and damaging these sealing components.

The method further includes a mass spectrometer coupled with the sampling interface to filter and analyze the sampled ions through the sampling orifice. The mass spectrometer may have various architectures including a single-quadrupole, triple-quadrupole, magnetic sector, ion trap, time-of-flight, ion mobility, or any other type. The mass spectrometer typically works under vacuum. One or more vacuum pumps may be connected to the mass spectrometer to provide the vacuum inside the mass spectrometer.

The method further comprising of a sample introduction system to introduce the sample of interest into the ICP torch to be atomized and ionized by the plasma and analyzed by the mass spectrometer. The sample introduction system may introduce the sample to the plasma in the form of aerosol, atomized solution, evaporated suspension, single particles, powder, ablated material, gas, or any other suitable forms. Usually, a flow of carrier gas transport the sample into the plasma. This gas may be one or a combination of various atomic or molecular gases such as argon, helium, air, nitrogen, oxygen, hydrogen, water, etc. The flow rate of the carrier gas should be adjusted to optimize signal intensity, sensitivity, plasma robustness, signal stability, etc. The carrier gas flow rate may be in the range of 0.05-2 L/min, preferably 0.1-1 L/min, also 0.2-0.6 L/min.

The method further includes the following steps for analyzing a sample of interest: Pumping down the mass spectrometer and sampling interface to reach vacuum conditions, generating a plasma inside the ICP torch, preparing a sample of interest and injecting it into the plasma using the sample introduction system. The plasma atomizes and ionizes the sample to generate an abundance of sample ions. The generated ions being sampled by the sampler orifice. The plasma usually works under atmospheric conditions, while pressure behind the sampler orifice is kept below atmosphere to suck in the ions. The sampling interface being totally air-cooled without any need for water-cooling or a water chiller, to dissipate the heat generated by the ICP torch. Transferring and filtering the ions of interest through various stages, ion guides, ion lenses, interface cones, collision cells, or mass filters inside the mass spectrometer until they reach the ion detector to be detected and analyzed. Connecting the mass spectrometer to a computer for data collection and analysis.

The invention claimed is:

1. An instrument, comprising:

a) an analyte introduction system;

b) a high-temperature analyte ionization system fluidically coupled to the analyte introduction system to receive and at least partially heat, melt, evaporate, atomize, and ionize an analyte from the analyte introduction system;

c) an analyte detection system;

d) an interface between the high-temperature analyte ionization system and the analyte detection system, wherein the interface is fluidically and thermally coupled with the high-temperature analyte ionization system and with the analyte detection system to receive the analyte from the high-temperature analyte ionization system and deliver the analyte to the analyte detection system, wherein the interface is thermally coupled to a heat exchanger cooled with a cooling gas;

wherein heat transfer from the heat exchanger to the cooling gas is induced by a natural convention, by a forced convection, or by a combination of any of natural convection, forced convection, and radiation, and wherein the interface is thermally coupled with the analyte detection system through a set of thermal resistors configured to control a direction of heat propagation throughout the analyte detection system and control heat dissipation from the interface to the heat exchanger.

2. The system of claim 1, wherein the cooling gas is air.

3. The system of claim 1, wherein the heat exchanger is integral to the interface.

4. The system of claim 1, wherein the set of thermal resistors are any of a set of thin walls, long walls, insulators, materials with medium to low thermal conductivity, or a combination thereof.

5. The system of claim 1, wherein the heat exchanger has a heat exchanger body and a set of fins attached to it.

6. The system of claim 5, wherein a set of open-cell foams is attached to the heat exchanger body or the set of fins.

7. The system of claim 5, wherein a honeycomb structure is attached to the heat exchanger body or the set of fins.

8. The system of claim 1, wherein the interface is thermally coupled with the heat exchanger through a set of heat-pipes.

9. The system of claim 5, wherein a fan or a pump is used to force the cooling gas through the set of fins.

10. The system of claim 9, wherein the fan can pass 20-2000 CFM, and preferably between 50-200 CFM of the cooling gas through the heat exchanger.

11. The system of claim 6, wherein the set of open-cell foams is made of any of aluminum, molybdenum, titanium, copper, nickel, stainless steel, tungsten, carbon, ceramic, or a combination thereof.

12. The system of claim 6, wherein the set of open-cell foams has between 50% to 97% porosity and between 5 to 80 pores per inch (PPI) providing 400 to 5,300 m2/m3 specific surface area.

13. The system of claim 6, wherein the set of open-cell foams has a density in the range of 1-100 pores per inch (PPI), preferably between 5-20 PPI, and a relative mass density of the set of open-cell foams in the range of 1-30%.

14. The system of claim 6, in which the set of open-cell foams is attached to the heat exchanger by any one of brazing, thermal paste, thermal epoxy, or thermal grease, thereby minimizing the thermal contact resistance between the open-cell foams and the heat exchanger to effectively dissipate heat.

15. The system of claim 6, comprising, the set of open-cell foams sandwiched between said set of fins using a high temperature thermal epoxy.

16. The system of claim 6, wherein the set of open-cell foams is sandwiched between the said set of fins by placing a brazing sheet/foil of suitable composition between the set of open-cell foams and the set of fins and brazing them inside a furnace at a suitable temperature, wherein a vacuum furnace is used to prevent the formation of any oxides on surfaces which will deteriorate the quality of the braze.

17. The system of claim 1, in which the high-temperature analyte ionization system comprises a torch, an induction device, a radio-frequency generator electrically coupled to the induction device, and a torch housing, in which the induction device is configured to induce radio-frequency energy into at least a section of the torch to generate and sustain a high temperature plasma in the section of the torch.

18. The system of claim 17, in which temperature of the high temperature plasma is between 1000 K to 30,000 K, more commonly between 3000 K to 10,000 K.

19. The system of claim 1, in which the analyte detection system is a mass spectrometer comprising one or a combination of a mass analyzer, a detector, a vacuum chamber, an ion guide, or an ion lens.

20. The system of claim 19, in which the type of the mass spectrometer is any of a single quadrupole, triple-quadrupole, magnetic sector, ion trap, time-of-flight, or ion mobility.

21. The system of claim 19, in which the heat exchanger is at least partially attached to the vacuum chamber to dissipate heat from the vacuum chamber.

22. The system of claim 19, in which the interface is fluidically coupled with the mass spectrometer through a set of sealing components such as O-rings, gaskets, or washers to keep vacuum conditions inside the mass spectrometer, wherein heat transfer to the said set of sealing components is minimized by placing thermal resistors between the set of sealing components and the heated areas of the Interface or by placing the thermal resistors far away from the heated areas of the interface.

23. The system of claim 19, in which the interface comprises a sampler cone, thermally coupled to the interface, placed in front of a torch, having a sampler office fluidically and thermally coupled to the said torch on one end and to the mass spectrometer on the other end to receive the analyte from the said torch and deliver the analyte to the mass spectrometer.

24. The system of claim 23, in which the interface further comprises a skimmer cone between the sampler cone and the mass spectrometer, thermally coupled to the interface, having a skimmer orifice fluidically coupled to the sampler orifice on one end and to the mass spectrometer on the other end to transfer the analyte from the sampler orifice to the mass spectrometer.

25. The system of claim 24, in which at least one of the sampler cone or the skimmer cone is thermally coupled to the interface and the mass spectrometer through a set of thermal resistors configured to minimize the transfer of heat absorbed from the high-temperature plasma to the interface, the set of sealing components, the mass spectrometer, or other heat-sensitive parts of the system, while preventing the sampler cone or the skimmer cone from being thermally damaged or melted due to excessive heating.

26. The system of claim 24, in which one of a sampler cone surface or a skimmer cone surface exposed to the high temperature plasma is coated with a thermal barrier coating to act as thermal resistor and minimize heat transfer from the high temperature plasma to the sampler cone, the skimmer cone, the interface, the set of sealing components, the mass spectrometer, and other heat-sensitive parts of the system.

27. The system of claim 23, wherein the torch has a torch housing, wherein the torch housing is coated with a thermal barrier coating to act as thermal resistor and minimize heat transfer from the high temperature plasma to the interface, the set of sealing components, the mass spectrometer, and other heat-sensitive parts of the system.

28. The system of claim 26 or 27, wherein the sampler cone, the skimmer cone, or the torch housing has multiple layers of the thermal barrier coating, wherein a thickness of the thermal barrier coating is in the range of 50 nm to 5 mm, preferably between 1 μm to 0.5 mm, and the coating material is any one or a combination of yttria-stabilized zirconia (YSZ), alumina, yttria, cerin, zirconia, rare-earth oxides, rare-earth zirconates.

29. The system of claim 27, in which the said thermal barrier coating has a porous structure which makes it radiate heat as a blackbody emitter and cool the interface more effectively.

30. The system of claim 1, in which the analyte introduction system comprises one or a combination of a nebulizer, an injector, a spray chamber, a thermos spray system, an electrospray system, a laser ablation system, a vaporizer, an ultrasonic nebulization system, a liquid chromatograph, a gas chromatograph, or an aerosol desolvation system.

31. The system of claim 26, in which a channel is placed beneath the sampler cone, said channel comprises an additional orifice of the channel between the sampler cone and the skimmer cone for at least part of the analyte to pass through.

32. An air cooled inductively coupled plasma mass spectrometer (ICP-MS), the air cooled ICP-MS, comprising:

a) a sample introduction system;

b) an ICP ionization source, comprising of a plasma torch and a torch housing to generate a plasma;

c) an air cooled interface having a front surface that is exposed to a high temperature plasma, a structure configured to have a heat transfer with air, and a sampling orifice, which takes an ion beam into a mass spectrometer (MS), configured to provide cooling to control heat dissipation while directing heat toward a predefined regions of the air cooled interface to keep the ion beam at a predefined temperature to avoid recombination and clustering, and d) wherein the heat transfer is induced by one or more of a natural convention, a forced convection or a thermal radiation, and using one or more air fans.

33. The air cooled ICP-MS of claim 32, wherein the structure of the air cooled interface is tubular or rectangular having an inner surface and an outer surface, and wherein the outer surface has a set of fins, and wherein the inner surface receives and transfers heat from the ICP to the outer surface to dissipate heat through its fins to the air.

34. The air cooled ICP-MS of claim 33, wherein the air cooled interface comprises of an outer shell forming an enclosure with an inlet port and an outlet port, wherein air enters the enclosure of the air cooled interface through the inlet port and goes through the enclosure and leaves through the outlet port.

* * * * *